(12) United States Patent
Shaffer et al.

(10) Patent No.: US 6,973,027 B1
(45) Date of Patent: Dec. 6, 2005

(54) SYSTEM AND METHOD FOR MAINTAINING A COMMUNICATION SESSION OVER GATEKEEPER FAILURE

(75) Inventors: Shmuel Shaffer, Palo Alto, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 941 days.

(21) Appl. No.: 09/932,544

(22) Filed: Aug. 17, 2001

(51) Int. Cl.[7] ............................................. H04J 1/16
(52) U.S. Cl. ...................... 370/218; 370/352; 370/401; 370/410; 714/2; 714/25
(58) Field of Search ............................. 370/217–218, 370/221, 352, 401, 410; 714/1–2, 25

(56) References Cited

U.S. PATENT DOCUMENTS

| | | | |
|---|---|---|---|
| 6,363,065 B1 * | 3/2002 | Thornton et al. ............ | 370/352 |
| 6,625,256 B1 * | 9/2003 | Tasker et al. ............ | 379/32.04 |
| 6,674,713 B1 * | 1/2004 | Berg et al. ............ | 370/217 |
| 6,738,343 B1 * | 5/2004 | Shaffer et al. ............ | 370/216 |
| 6,785,223 B1 * | 8/2004 | Korpi et al. ............ | 370/218 |

\* cited by examiner

Primary Examiner—Ricky Ngo
Assistant Examiner—Nittaya Juntima
(74) Attorney, Agent, or Firm—Baker Botts L.L.P.

(57) ABSTRACT

The present invention provides a method for maintaining a communication session between telephony devices, which includes establishing a first TCP/IP signaling communication link between a first telephony device and a proxy. The first TCP/IP signaling communication link is operable to communicate first keep alive signals between the proxy and the first telephony device. A second TCP/IP signaling communication link is established between a primary gatekeeper and the proxy. The second TCP/IP signaling communication link is operable to communicate second keep alive signals between the proxy and the primary gatekeeper. The first and second TCP/IP signaling communication links are terminated at the proxy. Therefore, a communication session between the first telephony device and a second telephony device may be maintained even if the second keep alive signals are interrupted.

30 Claims, 2 Drawing Sheets

SYSTEM AND METHOD FOR MAINTAINING A COMMUNICATION SESSION OVER GATEKEEPER FAILURE

TECHNICAL FIELD OF THE INVENTION

This invention relates generally to the field of packet-based communication networks, and more specifically to a system and method for maintaining a communication session over gatekeeper failure.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network. However, the integration of telecommunications and data transmissions is still ongoing, and many features that were available to users of traditional telecommunications networks have not been made available to users of VoIP and similar technologies.

SUMMARY OF THE INVENTION

The present invention includes a system and method for maintaining a communication session over gatekeeper failure that substantially eliminates or reduces disadvantages or problems associated with previously developed systems and methods. In particular, the present invention contemplates a proxy capable of serving as an intermediary between two or more telephony devices to maintain a communication session between the telephony devices if communication with a gatekeeper is lost.

In accordance with a particular embodiment of the present invention, a method for maintaining a communication session between telephony devices includes establishing a first TCP/IP signaling communication link between a first telephony device and a proxy. The first TCP/IP signaling communication link is operable to communicate first keep alive signals between the proxy and the first telephony device. A second TCP/IP signaling communication link is established between a primary gatekeeper and the proxy. The second TCP/IP signaling communication link is operable to communicate second keep alive signals between the proxy and the primary gatekeeper. The first and second TCP/IP signaling communication links are terminated at the proxy. Therefore, a communication session between the first telephony device and a second telephony device may be maintained even if the second keep alive signals are interrupted.

In accordance with another embodiment of the present invention, a third TCP/IP signaling communication link between the second telephony device and the proxy is established. The third TCP/IP signaling communication link is operable to communicate third keep alive signals between the proxy and the second telephony device. The third TCP/IP signaling communication link is also terminated at the proxy. The proxy is further operable to receive first and second call control signals from the first and second telephony devices, respectively. The call control signals are pass through to the primary gatekeeper, if communications with the primary gatekeeper are available. The proxy is further operable to communicate the first and second call control signals to a backup gatekeeper, if the communications with the primary gatekeeper are interrupted.

Technical advantages of the present invention include a system and method for maintaining a communication session between telephony devices over gatekeeper failure. According to the present invention, a proxy may be logically inserted between two or more telephony devices to act as an intermediary between these devices. Media communication links can then be maintained between the telephony devices when TCP/IP connectivity with the gatekeeper is interrupted or lost. Accordingly, communication sessions conducted in accordance with protocols (e.g. H.323) that require the termination of media communication links when TCP/IP signaling communication links are lost, may continue over gatekeeper failure. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
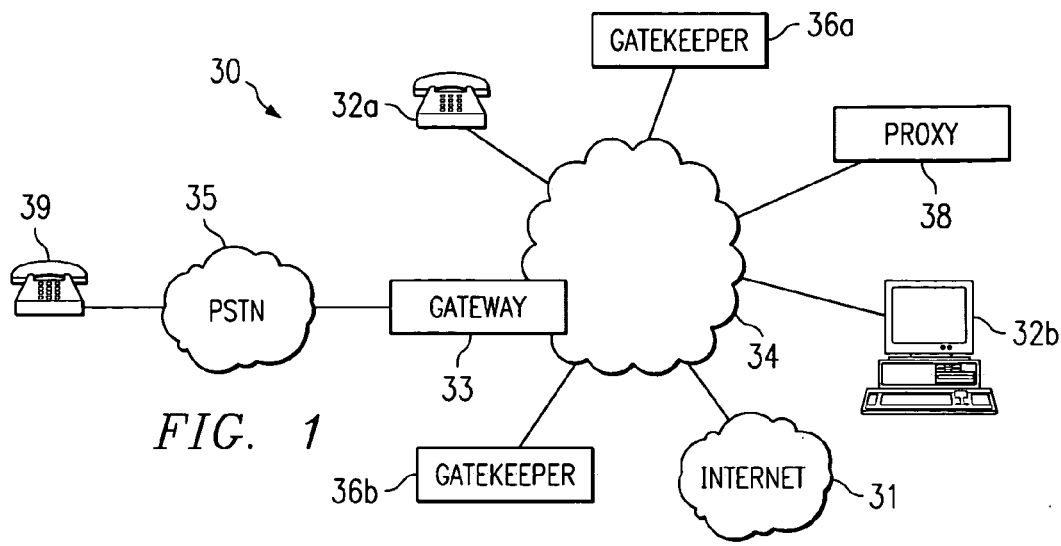
FIG. 1 illustrates a communications network in accordance with a particular embodiment of the present invention.

FIG. 1 illustrates a communication system 30 that includes endpoints 32a and 32b (generally referred to as endpoints 32), that establish a communication session using network 34. Gatekeepers 36a and 36b (generally referred to as gatekeepers 36) control one or more endpoints 32 and/or communication sessions between endpoints 32a and 32b. According to the H.323 specification, the failure of TCP/IP communication between one of endpoints 32a or 32b, and gatekeeper 36a during a communication session between endpoints 32a and 32b requires the communication session between endpoints 32a and 32b to be torn down. Network 34 includes a proxy 38 operable to terminate TCP/IP communications and communicate with endpoints 32a and/or 32b on behalf of gatekeeper 36a. Proxy 38 transparently communicates this information with gatekeeper 36a. Accordingly, the failure of TCP/IP communication with gatekeeper 36a may go undetected by endpoints 32a and/or 32b. Therefore, the communication session between endpoints 32a and 32b may continue uninterrupted by the failure of TCP/IP communication with gatekeeper 36a, and/or a disruption of service experienced at gatekeeper 36a.

Endpoints 32 may be any combination of hardware and/or software that provide communication services to a user. For example, endpoints 32 may be a telephone, a computer running telephony software, a video monitor, a camera, or any other communication or processing hardware, software and/or embedded logic that supports the communication of packets of media using network 34. Endpoints 32 may also include unattended or automated systems, gateways, multi-point control unit (MCU) other intermediate components, or other devices that can establish media sessions. Although FIG. 1 illustrates two endpoints 32, communication system 30 contemplates any number and arrangement of endpoints 32 for communicating media. Furthermore, the described technologies and techniques for establishing a communication session between endpoints 32 may be adapted to establish a conference between more than two endpoints 32.

Although a specific communication network 34 is illustrated in FIG. 1, the term "communication network" should be interpreted as generically defining any network capable of transmitting audio and/or video tele-communication signals, data, and/or messages. Network 34 may be a local area network (LAN), wide area network (WAN), global distributed network such as the Internet, Intranet, Extranet, or any other form of wireless or wireline communication network. Generally, network 34 provides for the communication of packets, cells, frames, or other portions of information (generally referred to as packets) between endpoints 32. Network 34 may include any combination of gateways, routers, hubs, switches, and other hardware and/or software implementing any number of communication protocols that allow for the exchange of packets in communication system 30.

In a particular embodiment, network 34 employs communication protocols that allow for the addressing or identification of endpoints 32 coupled to network 34. For example, using Internet protocol (IP), each of the components coupled together by network 34 in communication system 30 may be identified in information directed using IP addresses. In this manner, network 34 may support any form and/or combination of point-to-point, multicast, unicast, or other techniques for exchanging media packets among components in communication system 30. Although the subsequent description will primarily focus on IP telephony devices, it should be understood that other appropriate telephony devices, such as Voice over Frame Relay devices, are also included within the scope of this description.

Network 34 may be directly coupled to other IP networks including, but not limited to, the Internet 31. Since IP networks share a common method of transmitting data, telecommunication signals may be transmitted between telephony devices located on different, but interconnected, IP networks. In addition to being coupled to other IP networks, network 34 may also be coupled to non-IP telecommunication networks through the use of gateway 33. For example, network 34 is coupled to Public Switched Telephone Network (PSTN) 35. PSTN 35 includes switching stations, central offices, mobile telephone switching offices, pager switching offices, remote terminals, and other related telecommunications equipment that are located across the country.

IP networks transmit data (including voice and video data) by placing the data in packets and sending each packet individually to the selected destination. Unlike a circuit-switched network (like PSTN 35), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32 are IP telephony devices. IP telephony devices have the capability of encapsulating a user's voice (or other inputs) into IP packets so that the voice can be transmitted over network 34. IP telephony devices may include telephones, fax machines, computers running telephony software (such as MICROSOFT NETMEETING), gateways, or any other device capable of performing telephony functions over an IP network.

An IP telephony device typically resembles a traditional digital PBX telephony device, but instead of connecting to a proprietary PBX port, the telephony device plugs into a LAN jack, such as an Ethernet jack. Alternatively, a user may plug a handset or headset directly into a personal computer 32b on network 34 to form a software based virtual IP telephony device. An IP telephony device operates as a standard IP network device and typically has its own IP address (which may be assigned dynamically). IP telephony devices may be H.323-compliant, so that they can communicate with other H.323 devices, such as a device executing MICROSOFT NETMEETING. IP telephony devices may also have the ability to handle data coding and decoding at the telephony device. This feature allows the telephony device to switch compression schemes on demand, such as switching between G.711 and G.723 compression.

Gatekeepers 36 include hardware, software, and/or embedded logic operable to identify, control, count, and/or supervise the traffic or flow through it. Gatekeepers 36 also include terminal and gateway registration regarding components of network 34, address resolution, bandwidth control, admission control, etc. In general, gatekeepers 36 perform network administrator functionality with regard to endpoints 32 and/or other components of network 34 under its control. In a particular embodiment, gatekeepers 36 may include a call manager. Accordingly, the terms "gatekeeper" and "call manager" may be used interchangeably throughout this specification. Although FIG. 1 illustrates two gatekeepers 36, network 34 contemplates any number and configuration of gatekeepers 36.

Gatekeeper 36 may be centrally located within network 34, or distributed between a plurality of components of network 34. Each gatekeeper 36 is an application that controls call processing, routing, telephone features and options (such as call hold, call transfer, and caller ID), device configuration, and other telephony functions and parameters within communication network 34.

Each gatekeeper 36 can control one or more endpoints 32 coupled with network 34. Call manager 36 may be implemented as software executing on one or more computers coupled to network 34. The gatekeeper software may be embodied in any type of computer-readable medium including, without limitation, hard drives, diskettes, CD-ROMs, DVD-ROMs, or other optical or magnetic storage devices.

When an endpoint 32 is connected to network 34 or elsewhere in communication system 30 (or when it otherwise comes on-line), endpoint 32 may be assigned an IP address. The endpoint then registers with one or more call managers 36 with which it can communicate using its telephone number and/or its IP address. Alternatively, endpoint 32 may request that it be assigned a telephone number and/or an IP address by call manager 36. The term "telephone number" should be understood to include any appropriate combination of digits or characters or any other appropriate method of identifying a telephony device. Call manager 36 with which an endpoint 32 has registered creates an internal device process that is used to route signaling to and from endpoints 32a and 32b, from call manager 36, or other endpoints coupled with network 34.

The ability of a gatekeeper 36 to control any endpoint 32 in communication system 30 allows a call processing environment in which control of endpoints 32 may be distributed dynamically in response to changes in communication system 30. For example, if a call manager 36 goes offline, the endpoint 32 controlled by that call manager 36 can connect and register with an alternative call manager 36 in communication with communication system 30. Likewise, if a communication link between an endpoint 32 and a gatekeeper 36 goes down, the endpoint 32 may connect and register with an alternative gatekeeper 36 to which there is an operable communication path. Furthermore, the distributed control of endpoints 32 also provides for network scalability and loadsharing by allowing endpoints 32 to be controlled by any gatekeeper 36, regardless of physical location. This avoids excess load on a particular gatekeeper 36 when new endpoints 32 come on line, and provides load balancing between gatekeepers 36.

When a user wishes to place a call from an endpoint 32 to another IP telephony device on network 34 (an intra-LAN call, for example), the calling telephony device transmits a signal to gatekeeper 36a indicating the desired function and the telephony device to be called. Gatekeeper 36a then checks on the availability of the called telephony device and, if available, sets up the call by instructing the originating telephony device to establish a media (audio and/or video) stream with the called (target) telephony device. The initial signaling between gatekeeper 36a and either the originating telephony device or the target telephony device is transmitted over network 34 using, for example, the Transmission Control Protocol (TCP).

The call is initiated by an endpoint 32 using gatekeeper 36a, or with the cooperation of gatekeeper 36a, using signaling over TCP. A codec (coder/decoder) at the endpoint converts the voice, video or fax signals generated by the users of the telephony devices from analog media signals into digital form. The codec may be implemented either in software or as special-purpose hardware in endpoints 32. In the case of an IP telephone, as the user speaks into the handset, the codec converts the analog voice signals into digital data. The digitally encoded data is then encapsulated into IP packets so that it can be transmitted over network 34.

The encapsulation may be performed by Real-Time Transport Protocol (RTP) running over User Datagram Protocol (UDP), or any other suitable communication protocol. As with TCP, UDP uses the Internet Protocol to get data packets from one computer to another. Unlike TCP, however, UDP does not provide sequencing and error-checking of the arriving packets. Once a UDP media packet has been received at the destination telephony device, a codec in the destination telephony device translates the digital data into analog audio and/or video signals for presentation to the user. The entire process is repeated each time that any call participant (or any other source) generates an audio, video, or fax signal.

In addition to intra-LAN calls, calls can also be placed to and received from non-IP telephony devices that are connected to PSTN 35. Such calls are made through gateway 33. Gateway 33 accomplishes at least three things: (i) converts signaling protocols; (ii) converts signaling protocols (e.g., digital or analog to packets); and (iii) transcoding. For example, gateway 33 may convert analog or digital circuit-switched data transmitted by PSTN 35 to packetized data transmitted by network 34, and vice-versa. When voice data packets are transmitted from network 34, gateway 33 retrieves the data contained in the incoming packets and converts this digital data to the analog or digital format used by the PSTN trunk to which gateway 33 is coupled. Since the digital format for voice transmissions over an IP network is often different than the format used on the digital trunks of PSTN 35, the gateway provides conversion between these different digital formats, which is referred to as transcoding. Gateway 33 also translates between the VoIP call control system and other signaling protocols (e.g., SS7, T1, ISDN, etc.), used in PSTN 35.

For voice transmissions from PSTN 35 to network 34, the process is reversed. In a particular embodiment, gateway 33 takes the incoming voice transmission (in either analog or digital form) and converts it into the digital format used by network 34. The digital data is then encapsulated into IP packets and transmitted over network 34.

When making a call to a PSTN telephony device 39 from IP telephony device 32, the voice or fax signal generated by the user of IP telephony device 32 is digitized and encapsulated, as described above. The packets are then transmitted over network 34 to gateway 33. If more than one PSTN gateway 33 is coupled to network 34, gatekeeper 36 determines which gateway is to receive the transmission based on the telephone number (e.g., the North American Numbering Plan (NANP) number) of the PSTN telephony device. Gateway 33 receives the IP packets and converts the data to the format (either digital or analog) used by the PSTN trunk to which the gateway is connected. The voice signals are then sent to PSTN telephony device 39 over PSTN 35. This process, and the reverse process, is continued between PSTN 35 and network 34 through gateway 33 until the call is complete.

When a call is placed to an IP telephony device, for example endpoint 32, a call initiation request is first sent to gatekeeper 36. If the originating telephony device is an IP telephony device (e.g., an intra-LAN or inter-LAN IP call), the originating IP telephony device generates the call initiation request and sends the request to gatekeeper 36. If the originating telephony device is a non-IP telephony device, such as PSTN telephony device 39, gateway 33 first intercepts the incoming call, and sends a call initiation request to gatekeeper 36 indicating the IP telephony device that is being called. In either case, once gatekeeper 36 receives the call initiation request, gatekeeper 36 sends a signal to IP telephony device 32 offering the call to the telephony device.

If IP telephony device 32 can accept the call (e.g., it is not in use or under a Do Not Disturb instruction from the user), IP telephony device 32 replies to gatekeeper 36 that it will accept the call. Upon receiving this acceptance, gatekeeper 36 transmits a signal to IP telephony device 32 to cause it to ring. The telephony device's user can then hear the ring and can take the telephony device "off-hook" to receive the call. Taking the telephony device off-hook may include, but is not limited to, picking up a handset, pressing the ringing line's button, pressing a speakerphone button, or otherwise indicating that the telephony device is ready to receive the incoming call. For the purposes of this application, the term "off-hook" is used to generically indicate a condition of a telephony device when it is ready to initiate or receive telecommunication signals. Once IP telephony device 32 has been taken off-hook, gatekeeper 36 establishes an RTP audio and/or video stream between IP telephony device 32 and the originating telephony device. If the originating telephony device is a non-IP telephony device, such as PSTN telephony device 39, the data streaming occurs between IP telephony device 32 and gateway 33. Gateway 33 then transmits the audio and/or video data to PSTN telephony device 39.

Figure 2A:
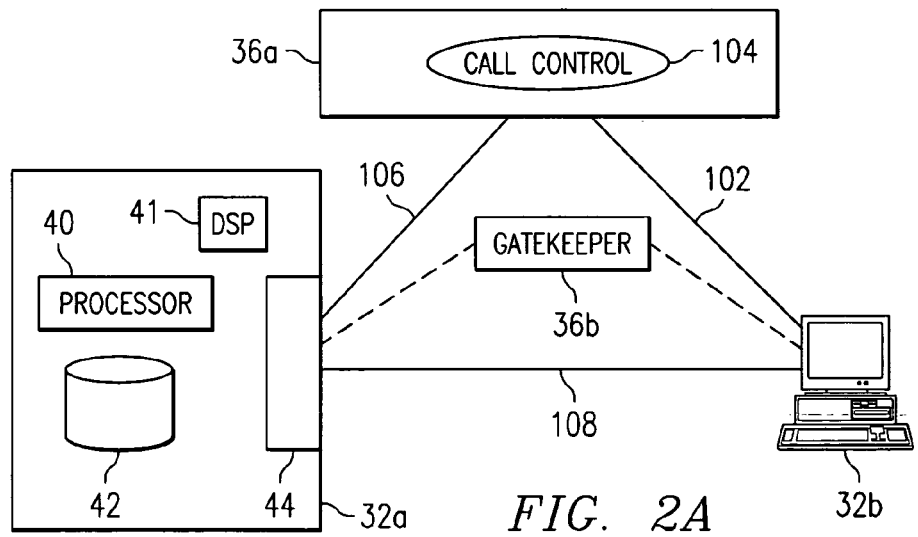
FIG. 2A illustrates a communication link between telephony devices using a gatekeeper.
Figure 2B:
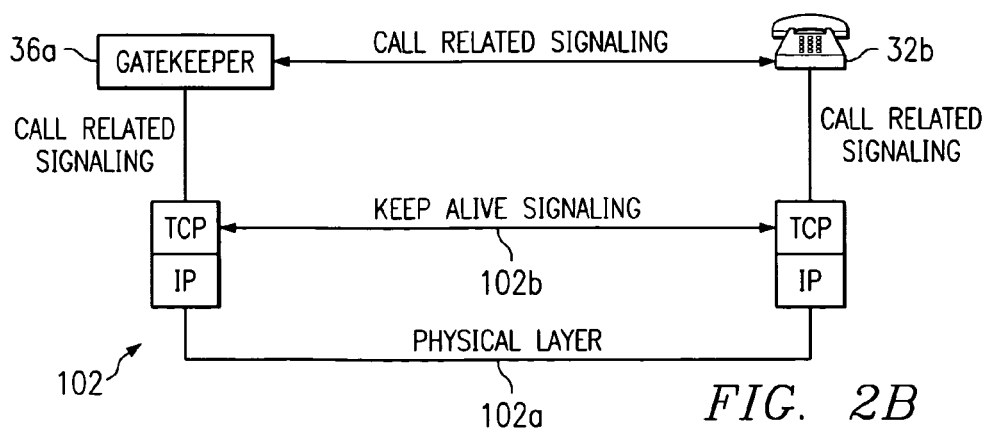
FIG. 2B illustrates a communication link between a one of the telephony devices of FIG. 1, and the gatekeeper.

FIGS. 2A and 2B illustrate a communication session between endpoints 32a and 32b using network 34. Since endpoints 32a and 32b include similar components and functionality, only endpoint 32 will be described in detail, however, it shall be recognized that all endpoints 32 coupled with network 34 may include the components and functionality described with regard to endpoint 32a. Endpoint 32a includes a processor 40, a memory 42, a network interface 44, and a digital signal processor (DSP) 41. DSP 41 accomplishes transcoding echo canceling, and/or other media processing functionality. Although the TCP and UDP protocols are specifically identified in the following discussion, any other suitable signaling and media transmission protocols may be employed within the teachings of the present invention.

In general, a communication session with an endpoint includes one or more signaling communication links, and one or more media communication links. For gatekeeper-routed signaling, call signaling is routed from an endpoint to a gatekeeper using a signaling communication link, instead of communication signals from endpoint to endpoint. Audio, video or other media, on the other hand, is communicated from endpoint to endpoint. Signaling communication links communicate call processing and control signals between endpoints 32 and gatekeeper 36a. Call Control signals include call initiation requests, information about the capabilities of each telephone device, instructions about establishing and/or tearing down logical channels (e.g., media communication links), and information about flow control. H.225 and H.245 are two protocols which address the type of signals transmitted over signaling communication links, in accordance with a particular embodiment of the present invention.

Media communication links are used to transfer audio and/or video media between endpoints. For example, during a telephone conversation, voice packets comprising the conversation between users of endpoints 32a and 32b are transmitted over media communication links. Similarly, media communication links may be used to transfer stored audio or video files and other information between endpoints 32a and 32b.

The communication links illustrated in FIG. 2A are used to enable a call between telephony devices 32a and 32b as follows. Telephony device 32b initially sends a call initiation request over TCP to gatekeeper 36 indicating a desire to communicate with telephony device 32a. Gatekeeper 36 then sends signaling information over TCP to telephony device 32a indicating the incoming call from telephony device 32b. If telephony device 32a accepts the call, gatekeeper 36 establishes RTP media streaming between telephony devices 32a and 32b by signaling telephony device 32b to begin streaming media to telephony device 32a. A similar process is performed when telephony device 32a returns an RTP media stream in response to the media stream from telephony device 32b.

H.323 is a communications standard that specifies protocols and procedures for providing multimedia communication services (including real-time audio, video and data communications) over packet-switched networks, such as IP networks. The protocols specified by the H.323 standard include several types of audio and video codecs, RTP, and two signaling standards known as H.225 and H.245.

H.225 call control signaling is used to establish a connection between two or more H.323 telephony devices. Once the connection is established using H.225 signaling, H.245 streaming control signaling is used to manage the transmission of information between the telephony devices using RTP. H.245 signaling is used to transmit messages between the telephony devices that include information about the capabilities of each telephony device, instructions regarding the opening and closing of the logical channels over which the RTP media streams are transmitted, and information about flow-control.

Although many IP telephony devices are H.323-compliant, they do not necessarily use all of the protocols specified by the H.323 standard. For example, IP telephony devices may use a proprietary signaling protocol instead of H.225 and H.245 signaling. Proprietary signaling protocols often offer more features and flexibility than the protocols provided in the H.323 standard. Some of these telephony features include call hold, call transfer, call park, and call conferencing. Accordingly, gatekeeper 36a may be used to provide such features and services to endpoints 32, using signaling communication links 102 and/or 106.

Similarly, the H.323 standard (e.g., suite of protocols) mandates that if TCP/IP layer connectivity between the endpoint 32b and gatekeeper 36a goes down, the communication session between endpoints is torn down. Therefore, if TCP/IP communication with gatekeeper 36a is interrupted for a period of time, the media communication link between the endpoints is torn down. Due to this H.323 mandate, endpoints 32 cannot switch to another gatekeeper, for example gatekeeper 36b, during a communication session. In order to switch to gatekeeper 36b, TCP/IP connectivity with gatekeeper 36a will be lost, and the communication session will be torn down. Loss of TCP/IP connectivity with gatekeeper 36a may be caused by failure of gatekeeper 36a, or failure of signaling communication links 102, 106, or other network components due to problems with software or hardware.

The illustrated embodiment of FIG. 2A includes an H.323 communication session established between IP telephony devices 32a and 32b using gatekeeper 36a. The communication session may be established by a processor executing call manager software stored on a computer-readable medium. The communication session includes signaling communication links 102 and 106 between telephony devices 32a and 32b via gatekeeper 36a, and a media streaming communication link 108 between telephony devices 32a and 32b. Accordingly, call processing and call control signals are communicated using communication links 102 and/or 106, and audio and/or media is communicated using media streaming communication link 108.

Each telephony device 32a and 32b may be any type of communication device including, but not limited to, IP and non-IP telephones, gateways coupling a packet-switched telephony network, PSTN 35 or any other circuit-switched network, and computers executing H.323 software such as MICROSOFT NETMEETING. For the purposes of this application, the term protocol means any format for transmitting data between two or more devices.

FIG. 2B illustrates signaling communication link 102, between endpoint 32b and gatekeeper 36a, in more detail. Signaling communication link 106 will be similar or identical to signaling communication link 102. Therefore, only signaling communication link 102 will be described in detail. A communication session between endpoint 32b and gatekeeper 36a will include several components, or layers, including a physical layer 102a, and a TCP/IP signaling layer 102b. Assuming, as an example, that a call is originally placed by telephony device 32b to telephony device 32a, the communication link is initiated using H.245 signaling over communication link 102, sent from telephony device 32b to gatekeeper 36a. This H.245 signaling is a type of call initiation request that indicates a desire to set up a telephony device call with telephony device 32a. A call control module 104 in gatekeeper 36a receives H.245 signaling 102 and determines that telephony device 32a is being called. Call control module 104 then signals telephony device 32a using H.245 signaling over communication link 106, to indicate the request from telephony device 32b. Telephony device 32a signals gatekeeper 36a back indicating whether it can accept the call. In this manner, a signaling link is created between telephony device 32b and telephony device 32a via gatekeeper 36a. If telephony device 32a can accept the call, media streaming communication link 108 is established between telephony device 32b and telephony device 32a using gatekeeper 36a.

During the course of the communication session between endpoints 32a and 32b, call control signaling is communicated from endpoints 32a and 32b via gatekeeper 36a using communication links 106 and 102, respectively. Communication media (audio or video messages) which comprise the communication session between endpoints 32a and 32b is communicated using media streaming communication link 108. Gatekeeper 36a offers control, management, features and services to endpoints 32a and 32b, which may be used during the communication session. The control of such features is accomplished using call control signaling over communication links 102 and 106.

After a communication session between endpoints 32a and 32b is established, there is little need for endpoint 32b and gatekeeper 36a to communicate call control signals with one another, until the end of the communication session or if endpoint 32b requests a particular feature or service from gatekeeper 36a. In order to continuously monitor (check for failure) of the communication link 102 between endpoint 32b and gatekeeper 36a, heartbeat signals are exchanged over TCP/IP signaling layer 102b. Heartbeat signals are periodic communications between endpoint 32b and gatekeeper 36a to ensure that communication link 102 is still active, and that endpoint 32b and gatekeeper 36a are still capable of communicating with each other. Heartbeat signals may also be referred to as "keep alive" signals. Any interruption in keep alive signals between endpoint 32b and gatekeeper 36a causes a complete tear down of the communication session between endpoint 32a and 32b including, without limitation, signaling communication links 102, 106, physical layer 102a, TCP/IP signaling layer 102b, and media communication link 108. Therefore, endpoints communicating according to the H.323 and related suite of protocols cannot maintain a communication session if there is an interruption or failure of TCP/IP signaling layer 102b.

If call manager 36a, and/or one or both of communication links 102, 106 fail during the communication session, the TCP/IP signaling layer 102b is interrupted, and certain protocols (e.g., the H.323 protocol) mandates that media streaming communication link 108 must be torn down, and the communication session must be torn down. In other words, H.323 does not support switch-over to a back-up gatekeeper for use when communication with the primary gatekeeper is interrupted, or lost. This is unnecessary, since call control signals are not essential to a communication session between endpoints after the call has been setup. In fact, after call setup, very few call control signals are communicated between endpoints 32a and 32b, and gatekeeper 36a, until the communication session is voluntarily terminated. The teachings of the present invention provide a system and method in which media streaming link 108 may be maintained even if TCP/IP signaling layer 102b communication with gatekeeper 36a is interrupted. Accordingly, the communication session between endpoints 32a and 32b can continue, despite the loss of TCP/IP signaling communication with gatekeeper 36a.

Figure 3A:
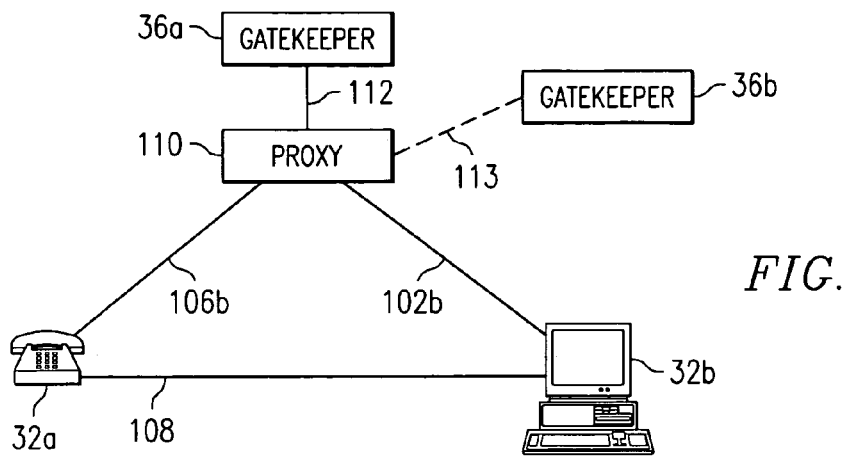
FIG. 3A illustrates a communication link between telephony devices using a proxy as an intermediary to the gatekeeper.
Figure 3B:
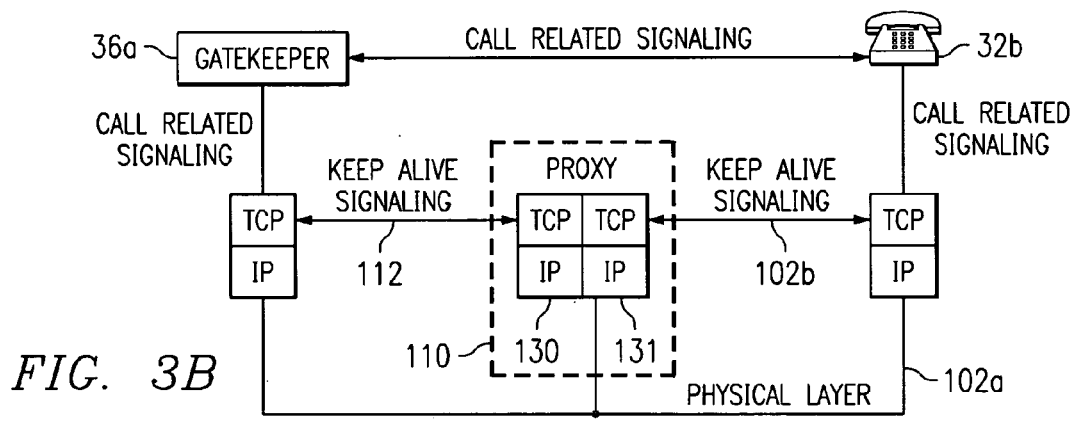
FIG. 3B illustrates a communication link between one of the telephony devices of FIG. 1, and the gatekeeper, in accordance with a particular embodiment of the present invention.

FIGS. 3A and 3B illustrates a communication session between endpoints 32a and 32b, in accordance with a particular embodiment of the present invention. An TCP/IP Proxy 110 is generated during the communication session between endpoints 32a and 32b. TCP/IP Proxy 110 terminates TCP/IP signaling layer communication links 102b and 106b from endpoints 32b and 32a, respectively. Accordingly, TCP/IP Proxy 110 terminates the TCP/IP connection which would otherwise exist between endpoints 32a and 32b, and gatekeeper 36a. However, TCP/IP Proxy 110 transparently passes through the TCP/IP call control signals to gatekeeper 36a, using a separate signaling communication link 112 between gatekeeper 36a and TCP/IP Proxy 110. In the illustrated embodiment, communication links 102b and 112 are a logical TCP/IP signaling layer between gatekeeper 36a and endpoint 32b. As illustrated in FIG. 3B, TCP/IP proxy 110 terminates the TCP/IP signaling communication links 102b and 112 at two locations 130 and 131; termination 130 terminates TCP/IP signaling from gatekeeper 36a, and termination 131 terminates TCP/IP signaling from endpoint 32b.

TCP/IP Proxy 110 can be run on any IP enabled entity in a network, for example routers, switches, PCs or other IP communication devices. The TCP/IP Proxy 110 may include hardware, software and/or embedded logic. Since the features and functions of TCP/IP Proxy 110 are not complex (relative to gatekeeper 36a), TCP/IP Proxy 110 is less apt to experience failure due to software, hardware, and/or TCP/IP bugs.

Since TCP/IP Proxy 110 terminates communication links 102b and 112, endpoints 32a and/or 32b are not aware of the loss of TCP/IP connectivity with gatekeeper 36a. In accordance with a particular embodiment of the present invention, if gatekeeper 36a fails, or TCP/IP Proxy 110 loses TCP/IP connectivity with gatekeeper 36a, media communication link 108 is maintained between endpoints 32a and 32b. In this embodiment, endpoints 32a and 32b will not have the benefit of services and features available from gatekeeper 36a after communication between TCP/IP Proxy 110 and gatekeeper 36 is interrupted. However, basic communication of media between endpoints 32a and 32b can continue. Accordingly, endpoints 32a and 32b can complete their communication session unaffected by the loss of TCP/IP connectivity with gatekeepers 36a.

Disconnect supervision is provided by detection of the end of RTP/RTCP signaling, or by tearing down at the TCP/IP connection between the TCP/IP proxy and the device 32. If TCP/IP Proxy 110 detects either of the above, the communication session between endpoints 32a and 32b, and communication links 102 and 106 are torn down.

In accordance with another embodiment of the present invention, proxy 110 may provide some or all of the features and services typically provided by gatekeeper 36a. Accordingly, a subset of gatekeeper features or services may be provided by TCP/IP Proxy 110. The subset may include some of the most used and/or most important features and services of gatekeeper 36a. Since less than all of the features and services may be provided by TCP/IP Proxy 110, TCP/IP Proxy 110 may be less complex than gatekeeper 36a, and therefore, less subject to software bugs or failure.

In accordance with yet another embodiment of the present invention, TCP/IP Proxy 110 may be configured to select a back-up call manager to handle the communication session between endpoints 32a and 32b. For example, if TCP/IP Proxy 110 detects the failure of gatekeeper 36a, or communication links 102b, 106b, or 112 are interrupted, TCP/IP Proxy may be configured to establish a signaling communication link 113 with gatekeeper 36b. In this embodiment, TCP/IP proxy 110 establishes TCP/IP communications with backup gatekeeper 36b. This allows endpoints 32a and 32b to establish communication links with gatekeeper 36b, without tearing down the communication between endpoints 32a and 32b. The seamless and transparent transition from gatekeeper 36a to gatekeeper 36b has no effect on endpoint 32a, 32b, or the communication session therebetween because keep alive signals between endpoints 32a and/or 32b and gatekeeper 36a are maintained. Therefore, in accordance with a particular embodiment of the present invention, a system and method by which an H.323 device(s) can be made to transparently switch over to a backup call manager during an active call, while preserving the call, is provided.

Figure 4:
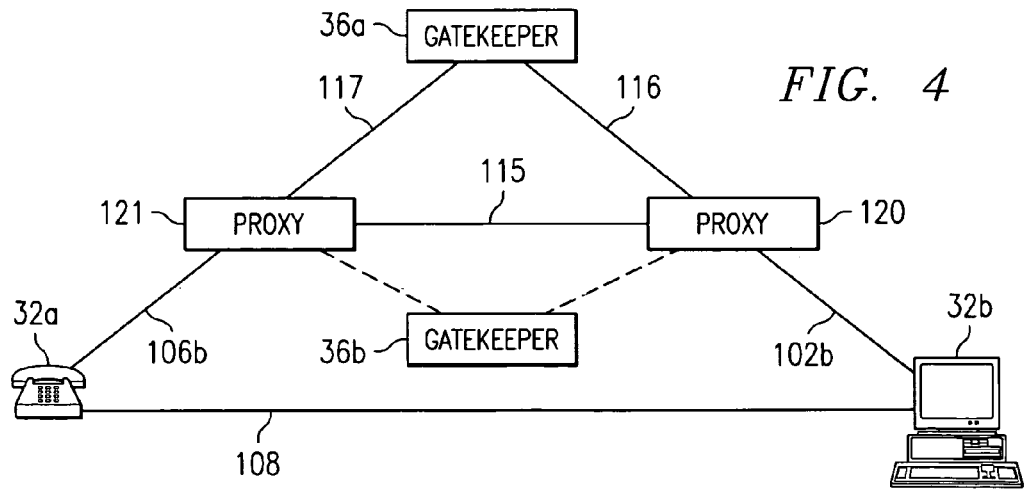
FIG. 4 illustrates a communication link between first and second telephony devices using two proxies as intermediaries to the gatekeeper.

FIG. 4 illustrates a communication session between endpoints 32a and 32b, in accordance with another embodiment of the present invention. In this embodiment, two proxies 120 and 121 are established to terminate signaling communication links 102b and 106b. Proxies 120 and 121 communicate with gatekeeper 36a using TCP/IP signaling communication layers 116 and 117, respectively. Since TCP/IP communication links 102b and 106b are "terminated" at proxies 120 and 121, respectively, the failure of gatekeeper 36a will not affect the TCP/IP keep alive signals between endpoints 32a and/or 32b and gatekeeper 36a. As previously discussed, a communication session between endpoints 32a and 32b may, therefore, continue using media communication link 108, even if communication of all related signaling with gatekeeper 36 is lost. In accordance with a particular embodiment of the present invention, this communication will continue without the features and services available from gatekeeper 36a.

Although two proxies 120 and 121 are illustrated in FIG. 4, any number of proxies may be used within the teachings of the present invention. The number and distribution of proxies throughout the network 34 decrease the likelihood that a network outage or failure of a component which causes the loss of TCP/IP connectivity with gatekeeper 36a, will also cause the loss of TCP/IP connectivity with the proxy to which a particular endpoint is coupled.

In accordance with another embodiment of the present invention, one or more of proxies 120, 121 may provide a subset of some or all of the features and services provided by gatekeeper 36a. In the event of loss of communication with gatekeeper 36a, proxy 120 for example, may provide such features and services to endpoint 32b. Similarly, proxy 121 may provide such features and services to endpoint 32a.

In the illustrated embodiment of FIG. 4, a TCP/IP communication link 115 is provided between proxies 120 and 121. This allows communication of signals between proxies 120 and 121. Accordingly, proxies 120 and 121 may be configured to operate in primary and backup roles, regarding communication with endpoints 32, and gatekeeper 36a. For example, proxies 120 and 121 may share a single IP address. This may be accomplished using the hot standby router protocol (HSRP—RFC 2281) by Cisco Systems, Inc. HSRP allows the sharing of a single IP address by two devices. In alternative embodiments, other protocols which allow the sharing of a logical address by two components in a network may be used.

One of the proxies, for example proxy 120, is selected as the "hot" or active proxy. Another proxy, for example proxy 121, is selected as the "standby" or backup proxy. In this embodiment, proxy 120 would be assigned the IP address unless and/or until communication with proxy 120 was lost (e.g., failure of proxy 120 or a communication link coupled with proxy 120). The failure of proxy 120 would be detected by proxy 121, or another network component, using a "heartbeat mechanism." In other words, communication would be maintained between proxy 120 and another network component at predetermined or regular intervals. When loss of communication with proxy 120 is detected, backup proxy 121 takes over and assumes the IP address. The teachings of the present invention extend the HSRP to the application level (layer), so that proxy 121 is informed when proxy 120 fails, or communication is lost.

Backup proxy 121 is aware of the TCP ports in use for the TCP relay via an application-level message sent to it by the primary proxy. Backup proxy is also updated about TCP sequence numbers being used on outbound connections. TCP connections to endpoints 32 (or other H.323 compliant devices associated with network 34) and gatekeeper 36 are set up using the shared IP address.

If proxy 120 fails, or communication with proxy 120 is lost, backup proxy 121 is informed of this event using the heartbeat mechanism of HSRP. Backup proxy 121 then takes over the shared IP address using HSRP. Since backup proxy 121 maintains a previously obtained list of TCP connections to endpoints 32 and gatekeeper 36, backup proxy 121 may continue the TCP relay function previously conducted by proxy 120.

This changeover from primary proxy 120 to backup proxy 121 is transparent to endpoints 32 and gatekeeper 36. Therefore, the communication session between endpoints 32a and 32b continues despite the failure, or loss of communication with proxy 120. Furthermore, sequence numbers are maintained across the switchover, so both remote sides consider the link to be active.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for maintaining a communication session between telephony devices, comprising:
  establishing a first TCP/IP signaling communication link between a first telephony device and a proxy, the first TCP/IP signaling communication link being operable to communicate first keep alive signals between the proxy and the first telephony device;
  establishing a second TCP/IP signaling communication link between a primary gatekeeper and the proxy, the second TCP/IP signaling communication link being operable to communicate second keep alive signals between the proxy and the primary gatekeeper;

terminating the first and second TCP/IP signaling communication links at the proxy; and maintaining a communication session between the first telephony device and a second telephony device if the second keep alive signals are interrupted.

2. The method of claim 1, further comprising:

establishing a third TCP/IP signaling communication link between the second telephony device and the proxy, the third TCP/IP signaling communication link being operable to communicate third keep alive signals between the proxy and the second telephony device; and terminating the third TCP/IP signaling communication link at the proxy.

3. The method of claim 2, wherein the proxy is operable to receive first and second call control signals from the first and second telephony devices, respectively, the proxy being further operable to pass through the first and second call control signals to the primary gatekeeper, if communications with the primary gatekeeper are available.

4. The method of claim 3, further comprising:

a backup gatekeeper; and wherein the proxy is operable to communicate the first and second call control signals to the backup gatekeeper if the communications with the primary gatekeeper are interrupted.

5. The method of claim 1, further comprising:

monitoring communications between the proxy and the gatekeeper; and transferring control of the communication session to a backup gatekeeper, if the communications between the proxy and the gatekeeper are interrupted.

6. The method of claim 5, wherein the communications between the proxy and the gatekeeper are monitored using a heartbeat mechanism.

7. The method of claim 1, wherein the first telephony device utilizes a protocol configured to automatically tear down the communication session between the first telephony device and the second telephony device if an interruption of TCP/IP connectivity with the gatekeeper is detected at the first telephony device.

8. The method of claim 1, wherein the first and second telephony devices communicate using the ITU H.323 suite of protocols.

9. The method of claim 1, wherein the proxy is configured to provide a subset of features available from the gatekeeper, if communications between the proxy and the gatekeeper are interrupted.

10. The method of claim 8, wherein the communication session is established using H.225 call control signals.

11. The method of claim 1, wherein the communication session between the first and second telephony devices comprises a Voice over Internet Protocol (VoIP) communication session.

12. The method of claim 1, wherein the communication session between the first and second telephony devices comprises a Real-time Transport Protocol (RTP) communication session.

13. A method for maintaining a communication session between telephony devices, comprising:

establishing a first TCP/IP signaling communication link between a first telephony device and a first proxy, the first TCP/IP signaling communication link being operable to communicate first keep alive signals between the first proxy and the first telephony device;

establishing a second TCP/IP signaling communication link between a second telephony device and a second proxy, the second TCP/IP signaling communication link being operable to communicate second keep alive signals between the second telephony device and the second proxy;

terminating the first and second TCP/IP signaling communication links at the first and second proxies, respectively;

establishing third and fourth TCP/IP signaling communication links between the first and second proxies, respectively, and a primary gatekeeper, the third and fourth TCP/IP signaling communication links being operable to communicate third and fourth keep alive signals between the first and second proxies, respectively, and the primary gatekeeper; and maintaining a communication session between the first and second telephony devices if the third or fourth keep alive signals are interrupted.

14. The method of claim 13, wherein the first and second proxies are operable to receive first and second call control signals from the first and second telephony devices, respectively, the first and second proxies being further operable to pass through the first and second call control signals, respectively, to the primary gatekeeper if communications with the primary gatekeeper are available.

15. The method of claim 14, further comprising:

a backup gatekeeper; and wherein the first and second proxies are operable to communicate the first and second call control signals to the backup gatekeeper if the communications with the primary gatekeeper are interrupted.

16. The method of claim 13, further comprising:

monitoring communications between the first proxy and the primary gatekeeper; and transferring control of the communication session to a backup gatekeeper, if the communications between the first proxy and the gatekeeper are interrupted.

17. A method for maintaining a communication session between telephony devices, comprising:

establishing a first TCP/IP signaling communication link between a first telephony device and a primary proxy, the first signaling communication link being operable to communicate first keep alive signals between the primary proxy and the first telephony device;

establishing a second TCP/IP signaling communication link between a second telephony device and the primary proxy, the second TCP/IP signaling communication link being operable to communicate second keep alive signals between the second telephony device and the primary proxy;

terminating the first and second TCP/IP signaling communication links at the primary proxy;

establishing a third TCP/IP signaling communication link between the primary proxy and a gatekeeper, the third TCP/IP signaling communication link being operable to communicate third keep alive signals between the primary proxy and the gatekeeper; and maintaining a communication session between the first and second telephony devices if the third keep alive signals are interrupted.

18. The method of claim 17, further comprising:

monitoring communications with the primary proxy;

transmitting the first and second keep alive signals from the first and second telephony devices, respectively, to a backup proxy, if the communications with the primary proxy are interrupted;

the primary and backup proxy each sharing a common logical IP address; and maintaining the communication session between the first and second telephony devices if the communications with the primary proxy are interrupted.

19. The method of claim 18, wherein the primary and backup proxies share the common logical address according to the Hot-Standby Router Protocol (HSRP).

20. A system, comprising:
a proxy being operable to communicate first keep alive signals with a first telephony device;
a primary gatekeeper being operable to communicate second keep alive signals with the proxy; and
the proxy being further operable to terminate first and second TCP/IP communication links between the first telephony device and the proxy, and the primary gatekeeper and the proxy, respectively, such that a communication session between the first telephony device and a second telephony device is maintained if the second keep alive signals are interrupted.

21. The system of claim 20, wherein the proxy is further operable to pass through call control signals received from the first and second telephony devices, to the primary gatekeeper, if communications with the primary gatekeeper are available.

22. The system of claim 21, wherein the proxy is further operable to transmit the call control signals to a backup gatekeeper, if the communications with the primary gatekeeper are not available.

23. Logic encoded in media for maintaining a communication session between telephony devices, the logic being operable to perform the following steps:
establish a first TCP/IP signaling communication link between a first telephony device and a proxy, the first TCP/IP signaling communication link being operable to communicate first keep alive signals between the proxy and the first telephony device;
establish a second TCP/IP signaling communication link between a primary gatekeeper and the proxy, the second TCP/IP signaling communication link being operable to communicate second keep alive signals between the proxy and the primary gatekeeper;
terminate the first and second TCP/IP signaling communication links at the proxy; and
maintain a communication session between the first telephony device and a second telephony device if the second keep alive signals are interrupted.

24. The logic encoded in media of claim 23, wherein the logic is further operable to:
establish a third TCP/IP signaling communication link between the second telephony device and the proxy, the third TCP/IP signaling communication link being operable to communicate third keep alive signals between the proxy and the second telephony device; and terminate the third TCP/IP signaling communication link at the proxy.

25. The logic encoded in media of claim 24, wherein the proxy is operable to receive first and second call control signals from the first and second telephony devices, respectively, the proxy being further operable to pass through the first and second call control signals to the primary gatekeeper, if communications with the primary gatekeeper are available.

26. The logic encoded in media of claim 25, further comprising a backup gatekeeper and wherein the proxy is operable to communicate the first and second call control signals to the backup gatekeeper if the communications with the primary gatekeeper are interrupted.

27. A system, comprising:
means for establishing a first TCP/IP signaling communication link between a first telephony device and a proxy, the first TCP/IP signaling communication link being operable to communicate first keep alive signals between the proxy and the first telephony device;
means for establishing a second TCP/IP signaling communication link between a primary gatekeeper and the proxy, the second TCP/IP signaling communication link being operable to communicate second keep alive signals between the proxy and the primary gatekeeper;
means for terminating the first and second TCP/IP signaling communication links at the proxy; and
means for maintaining a communication session between the first telephony device and a second telephony device if the second keep alive signals are interrupted.

28. The system of claim 27, further comprising:
means for establishing a third TCP/IP signaling communication link between the second telephony device and the proxy, the third TCP/IP signaling communication link being operable to communicate third keep alive signals between the proxy and the second telephony device; and
means for terminating the third TCP/IP signaling communication link at the proxy.

29. The system of claim 28, wherein the proxy is operable to receive first and second call control signals from the first and second telephony devices, respectively, the proxy being further operable to pass through the first and second call control signals to the primary gatekeeper, if communications with the primary gatekeeper are available.

30. The system of claim 29, further comprising a backup gatekeeper and wherein the proxy is operable to communicate the first and second call control signals to the backup gatekeeper if the communications with the primary gatekeeper are interrupted.

* * * * *